United States Patent [19]

Strasilla

[11] 4,127,247  
[45] Nov. 28, 1978

[54] APPARATUS FOR THE PROPULSION OF A PERSON BY THE FORCE OF WIND, ESPECIALLY FOR SKIERS

[76] Inventor: Dieter Strasilla, Trankestr. 38,, D-7800 Freiburg, Fed. Rep. of Germany

[21] Appl. No.: 793,865

[22] Filed: May 4, 1977

[30] Foreign Application Priority Data

May 6, 1976 [DE] Fed. Rep. of Germany ....... 2619951

[51] Int. Cl.² .......................................... B64D 17/38
[52] U.S. Cl. ........................... 244/152; 280/11.37 S; 180/1 G; 244/DIG. 1; 244/151 A
[58] Field of Search ................. 244/16, DIG. 1, 152, 244/142, 151 R, 151 A, 151 B, 153 R, 155 R, 155 A, 145; 180/1 G; 280/11.37 S

[56] References Cited

U.S. PATENT DOCUMENTS

| 454,325 | 6/1891 | Brandt | 244/151 R |
|---|---|---|---|
| 996,058 | 6/1911 | Burns | 244/142 |
| 1,777,363 | 10/1930 | Hawes | 244/152 |
| 2,384,416 | 9/1945 | Derry | 244/152 |
| 2,405,333 | 8/1946 | Sheridan | 244/152 |
| 2,447,921 | 8/1948 | Thomas | 244/151 B |
| 2,511,263 | 6/1950 | Hiscock | 244/145 |
| 3,987,746 | 10/1976 | McCulloh | 244/155 A |
| 4,013,248 | 3/1977 | Kalabukhova et al. | 244/152 |

FOREIGN PATENT DOCUMENTS

| 454,437 | 7/1913 | France | 244/142 |
|---|---|---|---|
| 1,395,715 | 3/1965 | France | 244/153 R |
| 475,770 | 9/1969 | Switzerland | 280/11.37 S |
| 1,145,212 | 3/1969 | United Kingdom | 244/142 |

*Primary Examiner*—Galen L. Barefoot  
*Attorney, Agent, or Firm*—Blakely, Sokoloff, Taylor & Zafman

[57] ABSTRACT

An apparatus is described, particularly suitable for skiers, for propelling a skier by the force of wind. The apparatus includes a parachute-like sail with the shroud lines of the sail connected to a harness worn by the skier. Control lines extend along the sides of the sail towards the harness to provide directional control. The shroud lines are attached to a special holding device between the sail and harness, which device is connected to the harness by a quick release lock.

11 Claims, 4 Drawing Figures

APPARATUS FOR THE PROPULSION OF A PERSON BY THE FORCE OF WIND, ESPECIALLY FOR SKIERS

BACKGROUND OF THE INVENTION

1. Field of the Invention

This invention relates to equipment for the propulsion of a body (person or object) by use of a sail. This equipment consists of a parachute modified such that it may pull skiers, or the like.

2. Prior Art

Sail-like propulsion devices which take advantage of air currents have been known for ages. With this invention the force of wind is utilized as an aid for propelling a human body in a gliding motion. Another important object of the presented invention is the realization of locomotion not only in a practical and safe manner, but also in such a way that the equipment can be handled easily, not only during its operation but also during the preparation for its use and in its stowage after use. Meeting these requirements satisfactorily is very important, since the forces of wind, its strength and direction, may vary considerably.

SUMMARY OF THE INVENTION

The prior art problems are overcome by arranging the lines which hold or make steerable the sail, for example, the shroud lines as well as the control lines, in an orderly fashion and by attaching these lines to a holding device which by means of a quick release safety device is connected to the person being pulled. This measure assures an instant detachment from the sail not only in the case of danger but also upon arrival at the desired location. Here it is important that this can be done without entanglement of the various elements.

One arrangement achieving the desired operation consists of a rod or similar device used as a holding device for the shroud lines and control lines of the sail. Groups of shroud lines are attached to shackles which in turn are attached to the rod side-by-side.

It is also important to provide an arrangement on the holding device for handling the control lines by which the sail may be maneuvered to the left or right. The control lines are provided with grips or handles at their ends and provisions are made at the ends of the holding device for attaching and guiding these control lines.

The length of the rod serving as holding device for the lines and its distance to the body of the skier is preferably chosen such that its ends may be touched by the stretched out hands of the person. The holding rod is connected to the harness of the skier preferably by a strong rope forming a triangle, whereby both ends of the rope are connected to the ends of the rod. The holding rod in question may also consist of a strong piece of pipe. In this case the connecting rope may be pulled through the pipe and may be joined into a closed loop. By means of a quick release device fastened to the harness the sail (parachute) is connected to the body. A ring or similar device in the apex of the triangular connecting rope is used for the attachment of the quick release lock.

An important feature of the invention is an arrangement enabling one to stop and to make the sail ineffective. Another important feature is the fact that the invention comprises means preventing the entanglement of the sail and its lines and enabling the operator to quickly straighten out the collapsed sail to make it ready for reuse or to prepare it for stowage.

For this purpose a break line is used which is attached to the outer apex of the parachute and which is strung from that point around the forward outside of the parachute toward the holding rod. This arrangement enables one to hold the apex of the parachute by the break line when the holding rod is released, causing the unburdened parachute to collapse in the wind by turning it inside out or by turning it sideways. The break line then serves as a guide line or search line facilitating an effortless untanglement and straightening of the parachute even if the sail were twisted while collapsing. The end of the break line is attached to the harness of the person by means of another quick release lock.

Another improvement of the invention is the fact that a long rope may be attached to the previously mentioned connecting rope for the purpose of pulling one or more persons. If its far end is held, such an extension rope may also be used for recovering the parachute in case of emergency, strong winds, or in fog, when both connecting rod and break line are released for the sake of safety.

In steep terrain it is desireable to have the parachute clear the ground by letting it climb higher. For this purpose it may be arranged to extend the control lines towards the rear by a few meters beyond the holding rod. Then the ends of the control line extensions may be connected to a loop. By pulling this extension loop, for example, on an attached handle or grip, in one or the other direction forward or backward, the control lines can be activated. It is understood that for this case also the connecting rope between the holding rod in question and the harness is extended accordingly.

In the following the invention is described in detail and it is illustrated with the figures.

DETAILED DESCRIPTION OF THE INVENTION

Figure 1:
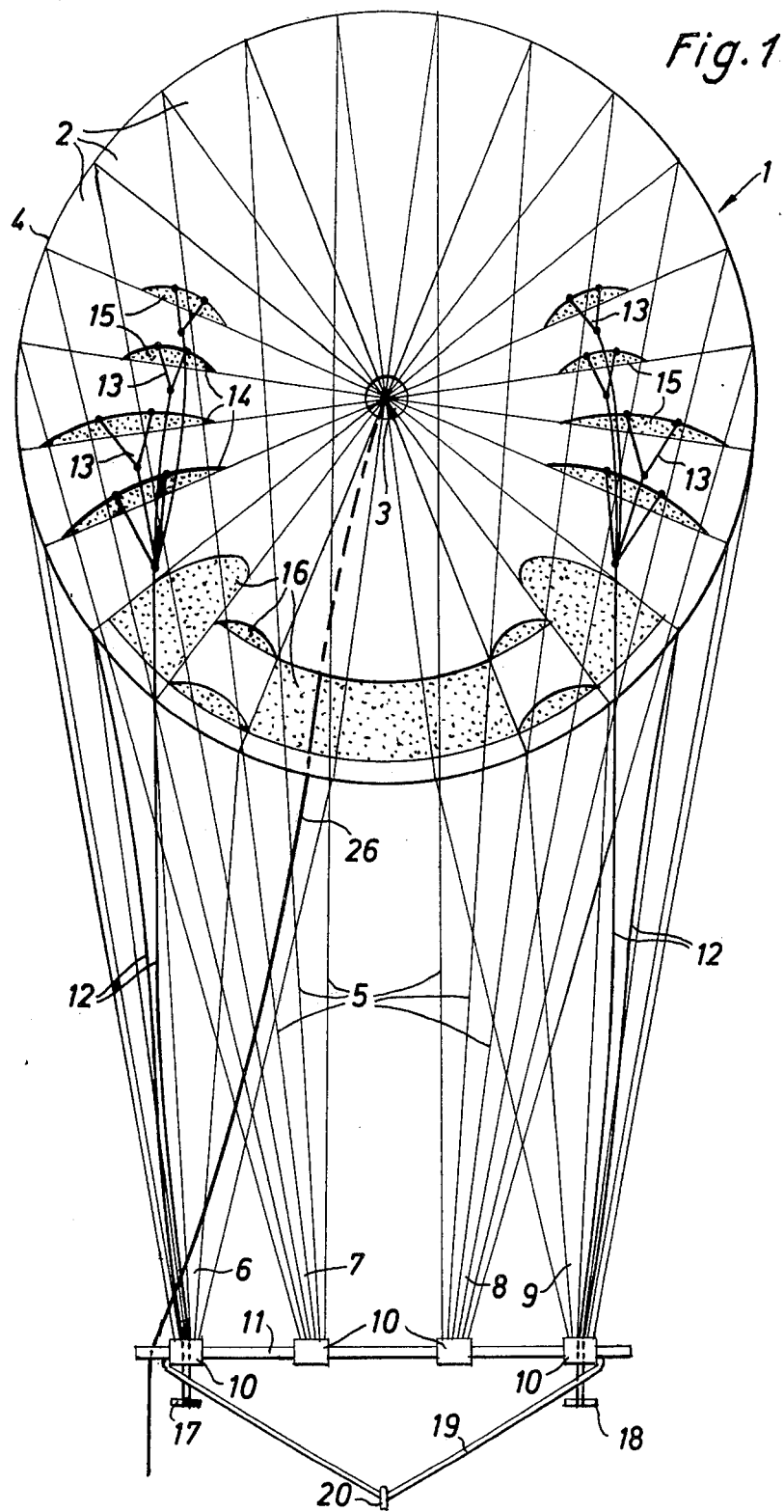
FIG. 1 is a schematic representation of an arrangement formed by a sail in the form of a parachute-like canopy with the respective shroud lines and control lines, intended, for example, for a skier.

FIG. 1 is a schematic representation of a canopy 1 serving as a sail which is similar to a parachute. It consists of various panels 2 separated by sewn reinforcements or by additional sewn-in lines, which radially extend from the apex 3. At the skirt 4 of the canopy the shroud lines 5 are attached for the purpose of holding the sail. These lines 5 are gathered in groups 6, 7, 8 and 9 at their other ends. The groups 6 to 9 are fastened to blocks 10 which, side-by-side, are attached to a holding device 11 consisting of a strong rod.

Control lines 12 are forked at their upper ends 13 and attached to the flaps 14 of the canopy 1. The other ends of lines 12 terminate near rod 11. The flaps 14 control openings 15 which may be selectively closed by pulling the respctive control lines 12, while they normally remain open by the pressure of the wind. The mentioned controlled openings 15 in the canopy are intended to be symmetrical at the right and at the left side of the canopy. This makes it possible for the canopy to create a pulling force under air pressure either straight ahead or to the left or right, depending on which openings are pulled shut. The wind pressure acts stronger on the side where the openings were pulled shut causing the canopy to move towards that side, while the pressure is diminished on the other side when air is allowed to escape through the openings. The openings in the canopy 1 are demonstrated by the dotted pattern. In FIG. 1 it can be seen that in the lower portion of the canopy large areas 16 are continuously kept open for the purpose of creating a lift on the canopy in order to have it clear the ground.

Figure 2:
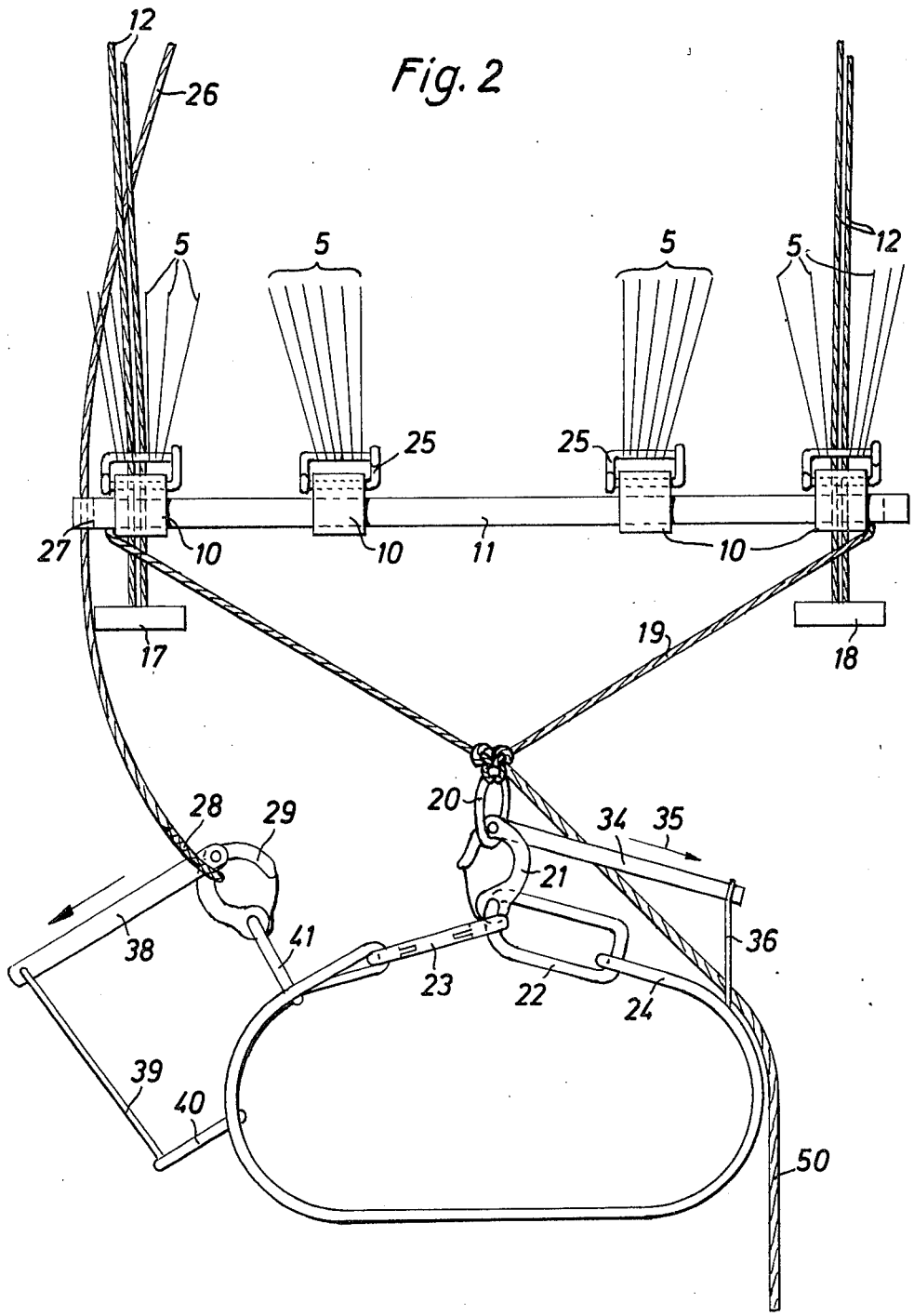
FIG. 2 illustrates, in detail, the rigging of the special parachute of FIG. 1. Its connection with the harness worn by the operator and the respective connecting devices are shown.

As shown in FIGS. 1 and 2 the control lines 12 at the right and left ends of rod 11 are guided in channels and are attached to a grip or handle 17 or 18, respectively.

A strong connecting rope 19 is attached to the holding device (rod) 11 as shown in FIGS. 1 and 2. This rope 19 is fastened at its ends to the outside of rod 11 to form a triangle. A ring 20 is disposed in the apex of this triangle. Ring 20 (FIG. 2) is engaged by a quick release hook 21. This hook is flexibly attached to a link 22 which engages another link 23. Both links 22 and 23 are firmly attached to a harness 24, which harness is worn by the person being propelled by the canopy 1. The length of the connecting rope 19 is chosen to afford easy manipulation with stretched out arms of the grips 17 and 18 of the control lines 12 by the person wearing the harness 24. FIG. 2 also shows the attachment of the shroud lines 5 to the shackles 25 which are flexibly mounted to rod 11 by means of blocks 10. Also another rope 50 may be tied to the apex of connecting rope 19 for the purpose of pulling persons or objects.

An important part of the invention is a break line 26. One end of the break line 26 is attached to the forward outside of the apex 3 of canopy 1. It is important that this break line 26 be strung along the outside of the canopy. At the other end this line is guided in a slot 27 on rod 11. By means of a loop 28 at this end the line is attached to a quick release hook 29, which is attached to a pivoting device 41, which in turn is attached to the harness 24.

The sail is detached very quickly when arriving at the goal or in case of danger, by opening the quick release hook 21. In this case ring 20 and the attached connecting rope 19 is immediately released leaving canopy 1 to the wind. Canopy 1 then turns inside out like an umbrella in the storm or its skirt moves sideways. In either case it collapses completely offering no more wind resistance. The canopy 1 is attached to the skier only by the break line 26 when collapsed. This line 26 then serves as a guide line or search line aiding one in untangling the canopy and lines. This provision is especially useful in the case when the parachute has twisted while collapsing.

Figure 3:
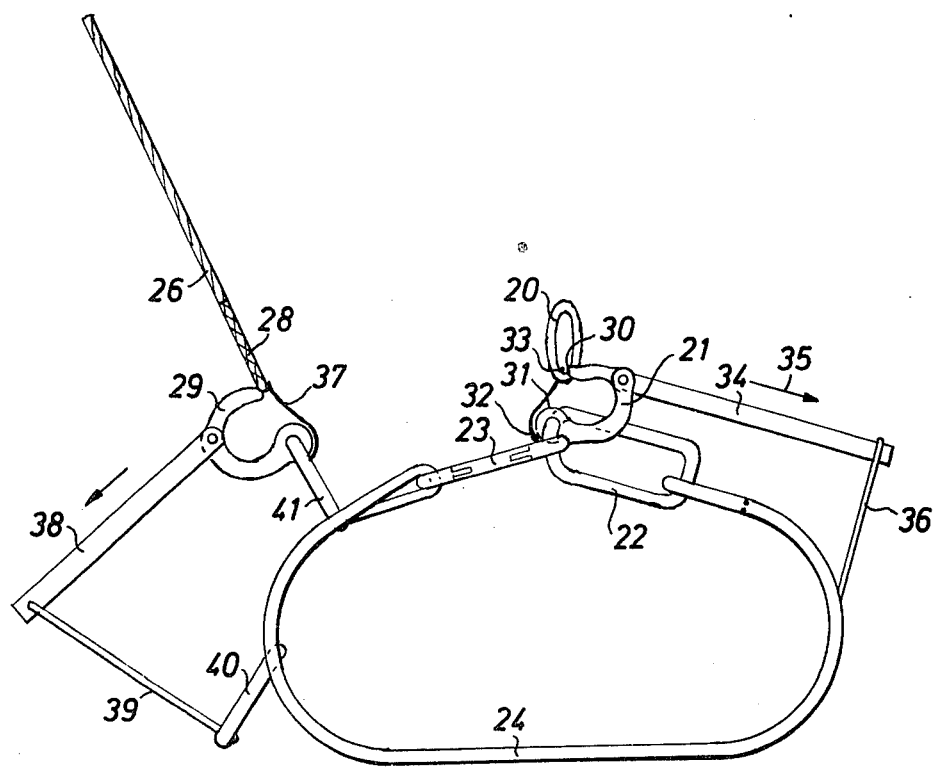
FIG. 3 is a partial view of FIG. 2 showing the various connecting devices at the moment of detachment.

In FIG. 3 the operation and action of the quick release locks are seen. The ring 20 is the connecting element between the connecting rope 19 of FIG. 2 and the harness 24. The ring 20 is hooked in the locking hook 21 in order to establish the connection of the canopy 1 with the harness 24 by means of the links 22 and 23. The normal position of hook 21 is shown in FIG. 2. In this position its opening 30 is closed by a spring 31 which firmly presses against the end of the hook and which is fastened to the bottom 32 of the hook 21. This spring may be opened by applying pressure from inside allowing the release of the ring. By this action the canopy is separated from the harness and it is caused to collapse as mentioned before.

The activation of the release mechanism is made possible by a lever 34 linked to the top of the hook 21. When pulling the lever 34 with a quick motion in the direction of arrow 35, hook 21 achieves the position shown in FIG. 3, allowing the release of ring 20 through the opening 30. This action may be accomplished very quickly. Lever 34 is connected to the harness 24 by means of a string 36 allowing it to remain in the same position so that it can be handled easily and safely.

The same type of quick release hook 29 is used for the break line 26. This mechanism comprises the spring 37, the lever 38, and the means 39 and 40 for securing it to the harness. Also hook 29 is flexibly connected to the harness 24 by means of a link 41.

Figure 4:
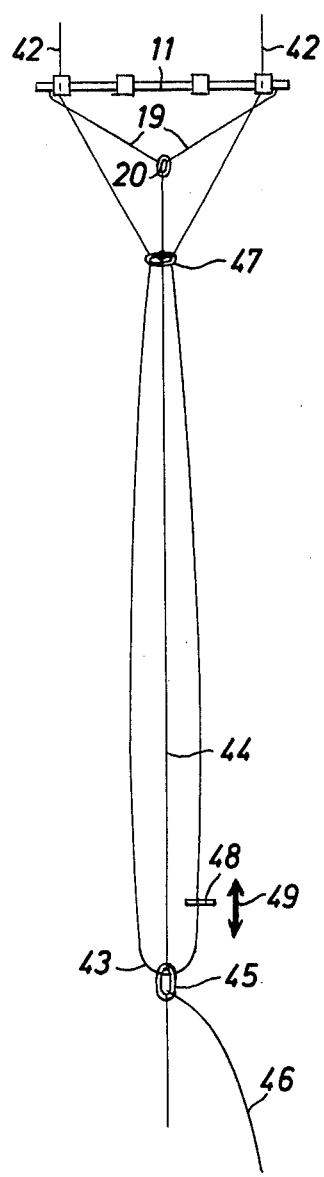
FIG. 4 is a schematic representation of a remote control for the control lines of the parachute.

FIG. 4 demonstrates schematically the construction of a remote control of the control lines of canopy 1 for the purpose of having the canopy stand high in the air in order to clear the ground in steep terrain. In this case the control lines 42 are extended a few meters. They form a loop 43 at their ends. Also an extension is created between the connecting rope 19 and the harness 24 by means of an extension rope 44. The extension rope 44 is attached to ring 20 while on its other end another ring 45 is connected to harness 24 by hook 21 as previously described. Also in this case a tow line 46 may be attached.

For the purpose of keeping the lines in good order an auxiliary ring 47 may be connected to the extension rope 44 acting as a guide for the control lines 42.

Within reach of the operator a grip 48 may be attached near the loop 43 of the control line 42. By pulling the grip 48 in the directions of arrows 49, the canopy may be steered to the right or left as described.

Many variations of the previously mentioned arrangement are possible. The connecting rope 19 attached to the holding rod 11 may also be realized by forming a closed loop which is threaded through a hollow rod thus eliminating the need for special fastening devices for the attachment of this rope to the rod.

The size and shape of canopy 1 may be varied from case-to-case. The usual commercial or military parachutes which are disqualified for jumping due to age or structural weakness may serve as an economical source of canopies and lines, requiring simple modifications for their conversion into the mentioned sail. This invention is not restricted to ski sailing, but it may also be used in the same manner for ice sailing, sledding as well as for water sports, roller skating or similar sports.

Instead of the quick release lock shown in FIG. 2 consisting of the attachment ring 20, the locking hook 21 with spring 31 and lever 34, commercially available quick release locks similar to those in auto seat belts may be used for the connection of connecting rope 19 with the harness 24.

Further it is advantageous, if the ends of the grouped shroud lines 5 are connected to the rod 11 in such a way that they may be disconnected. For this reason it is advantageous to use shackles that may be taken apart easily in the field. If it is necessary to separate one of the groups 5 of the shroud lines from the rod 11 it may be accomplished easily by separating a shackle. Other dismountable connection devices instead of the mentioned shackle will be obvious to one skilled in the art.

Instead of using the tow rope 15 the released sail may be straightened out by using a relatively thin recovery line. This line is attached with one end to the connecting rope 19 in a similar way as the tow rope 50. The other end is wrapped on a roll which is attached to the harness 24. Preferably a roll with an automatic rollup device is used.

In an embodiment not shown a regular geometrical shape may be used for the sail instead of the circular one, for example, a rectangular shape.

The open areas 16 cause a lift in the sail independent from the shape of the sail. It is also possible to choose a larger distance between the points for fastening the shroud lines on the lower half of the sail than on the upper portion, instead of the opening 16.

According to another embodiment not shown, it is possible to replace ring 20 by two adjacent rings which are radially joined by an axle allowing rotation of both rings around this axis. In this embodiment one of these rings is held by hook 21 while the other ring is connected to connection rope 19. In this way it is possible to rotate the sail around the fictitious axis extending from the ring axle in the direction of the wind without having to rotate the harness or without having to disconnect the sail from the harness. This is especially advantageous in the case when the canopy is upside down with the opening 16 on the top prior to takeoff. After takeoff it may be turned in its correct position by the aid of control lines 12.

Further the openings 15 and 16 may be covered by nets reducing the risk of entanglement by lines moving through the openings in a collapsed sail.

Thus, a sail-like apparatus particularly suited for skiers has been described.

I claim:

1. In an apparatus for the propulsion of a person utilizing wind power by a parachute-like sail where shroud lines of the sail are coupled to a harness worn by the user, an improvement comprising:
   a holding device connected to said shrouds;
   a coupling means for coupling said harness to the holding device, said coupling means including a quick release means for quickly decoupling said harness from said holding device;
   at least one control line controlling an opening in said sail, said control line extending to within reach of said user; and
   a break line having a first end attached to the apex of said sail and a second end directly coupled to said harness; whereby said user may control the direction of movement by pulling and releasing said control line and accomplish braking by decoupling said harness from said holding device with said break line remaining coupled to said harness and serving to collapse said sail.

2. The apparatus defined by claim 1 wherein said holding device includes a rod.

3. The apparatus defined by claim 2 wherein said control line is moveably mounted within a guide adjacent to the end of said rod.

4. The apparatus defined by claim 2 wherein said shroud lines are grouped in bundles and wherein each of said bundles is connected by a shackle in a side-by-side configuration to said rod.

5. The apparatus defined by claim 4 wherein said bundles of said shroud lines are detachably connected to said rod.

6. The apparatus defined by claim 1 wherein said control line includes a handle.

7. The apparatus defined by claim 2 wherein the distance between said harness and said rod is such that such user may grasp said rod.

8. The apparatus defined by claim 2, wherein said coupling means includes a rope forming a triangle with the ends of said rod and said quick release means.

9. The apparatus defined by claim 1 wherein said break line extends from said apex of said sail on the outside of said sail over the forward edge of said sail.

10. The apparatus defined by claim 1 including a tow line coupled to said holding device.

11. In an apparatus for the propulsion of a person utilizing windpower by a parachute-like sail where shroud lines of the sail are coupled to a harness worn by the user, an improvement comprising:
    a rod coupled to said shroud lines with the lines being grouped in bundles coupled in a side-by-side configuration to said rod;
    a coupling means for coupling said rod to said harness, said coupling means including a quick release means for quickly decoupling said harness from said rod;
    at least one control line controlling an opening in said sail, said control line being coupled to said rod; and
    a break line having a first end attached to the apex of said sail and a second end directly coupled to said harness;
    whereby said user may control the direction of movement by pulling and releasing said control line and accomplish braking by decoupling said harness from said rod with said break line remaining coupled to said harness and serving to collapse said sail.

* * * * *